United States Patent [19]

Lembcke

[11] Patent Number: 5,584,488
[45] Date of Patent: Dec. 17, 1996

[54] SEAL

[75] Inventor: Jeffrey J. Lembcke, Houston, Tex.

[73] Assignee: Baker Hughes Incorporatd, Houston, Tex.

[21] Appl. No.: 204,670

[22] Filed: Mar. 2, 1994

[51] Int. Cl.$^6$ .................................................. F16J 15/10
[52] U.S. Cl. ...................... 277/1; 277/123; 277/188 R; 277/209; 277/207 A
[58] Field of Search .................................. 277/1, 5, 6, 7, 277/121, 123, 165, 188 R, 227, 207 R, 208, 209, 211, 207 A

[56] References Cited

U.S. PATENT DOCUMENTS

| | | | |
|---|---|---|---|
| 2,148,101 | 2/1939 | Brucker | 277/227 |
| 3,572,734 | 3/1971 | Holt | 277/165 |
| 4,040,636 | 8/1977 | Albertson et al. | 277/227 |
| 4,188,998 | 2/1980 | Upton | 277/123 |
| 4,342,464 | 8/1982 | Wolf et al. | 277/209 |
| 4,553,759 | 11/1985 | Kilmoyer | 277/165 |
| 4,596,395 | 6/1986 | Miser | 277/123 |
| 5,064,207 | 11/1991 | Bengtsson | 277/227 |
| 5,390,939 | 2/1995 | Terauchi et al. | 277/227 |

OTHER PUBLICATIONS

*Baker Oil Tools Permanent Packers Catalog*, Baker Hughes Incorporated, 1993, no month.
Baker Packers Drawing No. 683–15, *Molded Seal Size 2⅜ Mor 'FL' On–Off Sealing Connector*, Feb. 21, 1984.

Primary Examiner—Diego F. F. Gutierrez
Assistant Examiner—John L. Beres
Attorney, Agent, or Firm—Rosenblatt & Redano, P.C.

[57] ABSTRACT

A seal is provided for a connector which must be reliably sealed in applications where the connection is made and undone as part of the normal use of the connector. The seal is particularly well suited to on-off tools used in downhole applications. The seal comprises of a nonmetallic insert holding bonded seals, preferably made of rubber. The nonmetallic insert provides support against seal extrusion. It also does not damage the sealing surface if movement or flexing result in contact between the insert and the opposed sealing surface.

5 Claims, 2 Drawing Sheets

SEAL

FIELD OF THE INVENTION

The field of this invention relates to seals, particularly seals that are useful in downhole applications.

BACKGROUND OF THE INVENTION

A wide variety of oilfield equipment uses seals to isolate zones of different pressure for a variety of different reasons. One common assembly that uses seals is known in the industry as an "on-off tool." An on-off tool has the capability of making a connection and selectively releasing the connection. It is frequently used in downhole applications to connect a tubing string to a packer or a crossover assembly. The on-off tool can connect and release in a variety of different ways. One way is a pin/slot combination involving a J-slot assembly, which allows the joint to be made up and released by a combination of rotational and longitudinal forces applied to the tubing string. Alternatively, a collet arrangement can be used, or hydraulic means can be employed for the make-up and release of the on-off tool.

In the past, operational problems have developed with seal assemblies that are put together downhole or at the surface. The physical action of the well fluid or gas acting on a portion of the joint before it is made up has, in the past, created a washing out effect which has displaced the sealing members from their mounted locations for sealing. Additionally, seals used in combination with metallic inserts have experienced insert flexing due to mechanical or thermal loads. When used in conjunction with close clearances, the desired sealing surface for the sealing elements has been scratched to the point where the sealing element is incapable of effective sealing. In an effort to counteract the possibility of marring the sealing surface due to deformations of the insert, attempts to use greater clearances between the components in the seal assembly when using the metallic inserts have created an additional concern over extrusion of the sealing elements from the insert.

Accordingly, the apparatus and method of the present invention have been developed to address the numerous needs of a sealing assembly, preferably those typically used in downhole applications. A nonmetallic insert has been developed to be used in combination with one or more bonded flexible seals in an assembly that addresses the potential problems experienced in the prior designs. The use of a softer material for the insert precludes the marring problem with the sealing surface. The softer insert material also has sufficient rigidity to assist as a back-up to the flexible bonded seals to greater limit the possibility of extrusion. Additional benefits are derived from the ease of manufacture and low cost of the sealing assembly of the present invention. The assembly can be used in a variety of applications in the oilfield and elsewhere, and is particularly suited to connections that must be made and released periodically where reliability of the seal is of utmost importance.

SUMMARY OF THE INVENTION

A seal is provided for a connector which must be reliably sealed in applications where the connection is made and undone as part of the normal use of the connector. The seal is particularly well suited to on-off tools used in downhole applications. The seal comprises of a nonmetallic insert holding bonded seals, preferably made of rubber. The nonmetallic insert provides support against seal extrusion. It also does not damage the sealing surface if movement or flexing result in contact between the insert and the opposed sealing surface.

DETAILED DESCRIPTION OF THE PREFERRED EMBODIMENT

Figure 1:
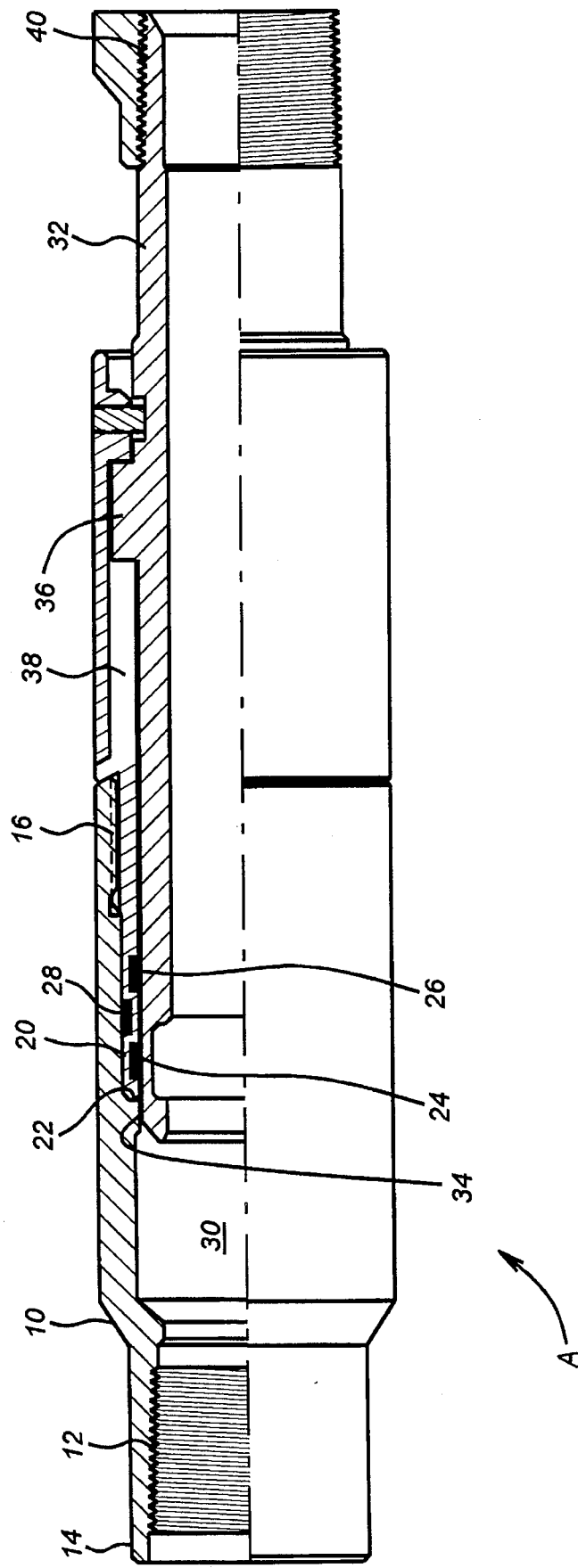
FIG. 1 is a sectional elevational view of a typical application of the seal of the present invention, showing its use in an on-off tool featuring a J-slot connect/disconnect mechanism.
Figure 2:
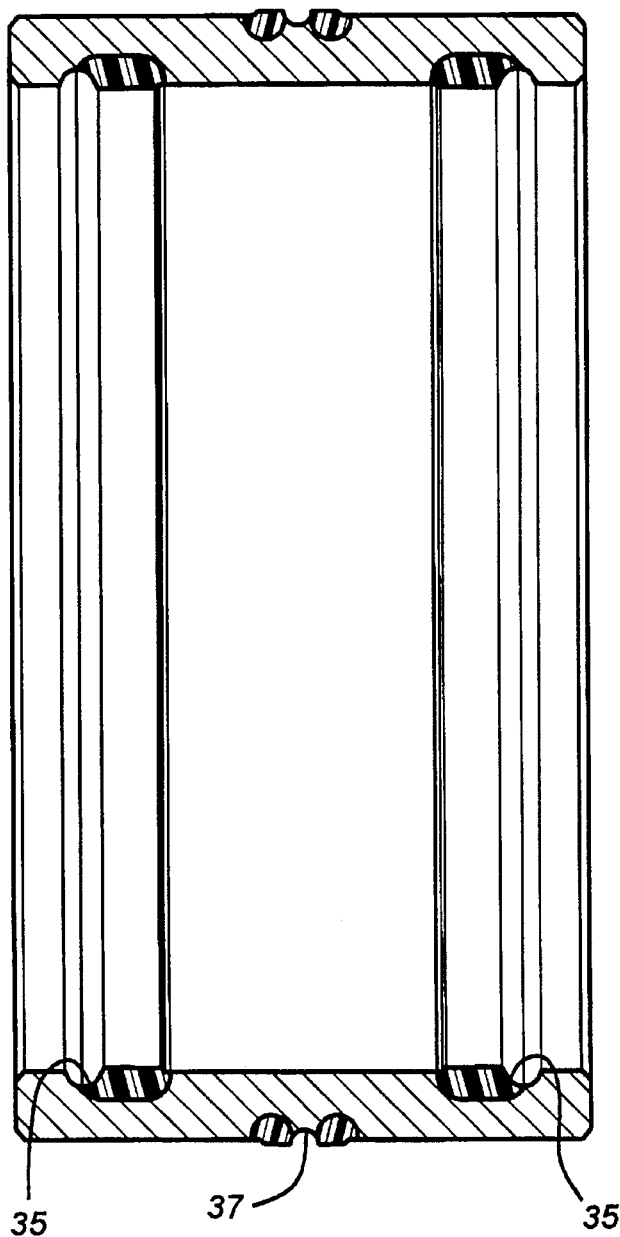
FIG. 2 is a sectional elevational view of the preferred embodiment.

The apparatus A is illustrated in FIG. 1. In the embodiment illustrated, an on-off tool is shown which has a top sub 10, including a thread 12 at its upper end 14. Top sub 10 has an internal thread 16 which facilitates the connection of J-slot assembly 38. J-slot assembly 38 holds the insert 20 against shoulder 22 on top sub 10. Insert 20 has a pair of internal seals 24 and 26 and an external seal 28. Seals 24, 26, and 28 are preferably made of nitrile rubber; however, other resilient compounds, such as AFLAS® (made by Asahi Glass Company), KALREZ® (made by DuPont, Inc.), etc., can be used without departing from the spirit of the invention. In the preferred embodiment, seals 24, 26, and 28 are bonded to insert 20 on three sides thereof. However, different arrangements of seals and different seal types can be used without departing from the spirit of the invention. In the preferred embodiment, seals 24, 26, and 28 are made of hydrogenated nitrile (Baker polymer specification E801). For example, seals 24 and 26 can be used as shown with an O-ring seal located in a groove used to replace seal 28. Alternatively, instead of using two seals 24 and 26, only one seal or more than two seals can be used without departing from the spirit of the invention. In fact, it is within the purview of the invention to use a nonmetallic insert 20 in combination with a bonded seal on at least one of its faces.

Top sub 10 has a bore 30 therethrough. Seal nipple 32 extends into bore 30 and has a sealing surface 34 which comes in contact with seals 24 and 26. Seal nipple 32 has a lug 36 which is selectively insertable into a J-slot-type assembly 38 mounted to top sub 10. The J-slot assembly 38 is a known way in the art to connect two segments and to selectively disconnect them. In the position shown in FIG. 1, the lug 36 is fully latched in J-slot 38 so that the on-off tool illustrated in FIG. 1 is fully made up and secured, with seals 24 and 26 sealing against seal nipple 32 and seal 28 sealing against the internal surface of top sub 10. At the lower end of seal nipple 32 is a thread 40 to which may be connected the downhole element such as a packer.

To make up the joint, a tubing string is run in the hole with top sub 10. Lug 36 is aligned with the J-slot 38. Thereafter, with a combination of vertical and twisting forces applied to the tubing string as known in the art, the top sub 10 is latched to the seal nipple 32. The connection can also be made up at the surface.

The insert 20 is preferably nonmetallic and made from a material called PEEK (PolyEtherEtherKetone) manufactured by Greene, Tweed & Company, filled with 32% by weight glass fibers (Baker polymer specification F202/PE-10); however, other nonmetallic materials can be used without departing from the spirit of the invention. Insert 20 is trapped by J-slot assembly 38 against shoulder 22. The top sub 10 and seal nipple 32 provide a barrier against radial growth and shrinkage beyond a certain limit. As a result, during the normal operation, the flexibility of a preferably nonmetallic insert 20 lends greater support to the seals, such as 24, 26, and 28, and further resists extrusion due to its flexibility. This type of seal can effectively seal against differential pressures of about 10,000 psi. Extrusion of the bonded seals such as 24 and 26 can occur in view of the clearances involved and the differential pressures applied. The insert 20, being preferably nonmetallic, has the required combination of yield strength and ductility so it can more readily accommodate the flexing action required to lend support against extrusion to the bonded seals 24, 26 or 28. Additionally, problems encountered in the past with washing out while running the tubing string with the top sub 10 into the hole are eliminated. The insert 20 is fully secured with J-slot assembly 38, With the use of bonded seals to the nonmetallic insert 20, the bonded seals are less likely to be washed out by the velocity of flowing liquids in the wellbore. Similarly, flexure of the nonmetallic insert 20 does not adversely affect the sealing surface of the seal nipple 32. In the past, using metallic inserts, any deflection, whether due to thermal stresses or mechanical loads, resulted in a scratching of the sealing surface 34 on the seal nipple 32. Since the preferred embodiment of the insert 20 is a nonmetallic material, even if there is slight flexing due to thermal stresses or mechanical stresses, there is no significant damage to the sealing surface 34 so that the joint as illustrated in FIG. 1 can still be made up reliably and repeatedly.

In the past, the clearance between top sub 10 and sealing surface 34 has had to be kept to a minimum to reduce the possibility of extrusion. Using the apparatus A of the present invention, the clearances may be the same or slightly larger since the additional flexibility of the nonmetallic insert provides an additional boost against potential extrusion. The preferred material, PEEK, provides the desired combination of yield strength and ductility to allow use in a variety of types of joints where sealing is required in environments ranging to temperatures of approximately 250°–350° F. The temperature limits of the seal depicted in FIG. 1 are more directly determined by the material used for the bonded seals 24, 26, and 28.

The use of the bonded seal design further adds to the resistance to washing out from fluid forces applied to the insert 20 while it is being run in the hole toward seal nipple 32.

Figure 3:
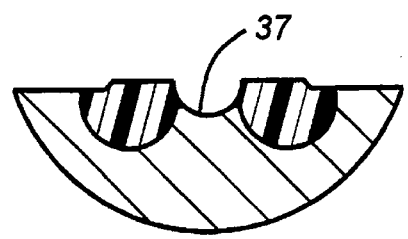
FIG. 3 is a detailed view of the outside seal of FIG. 2.
Figure 4:
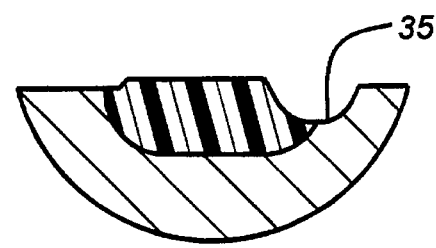
FIG. 4 is a detailed view of the inside seal of FIG. 2.

Referring to FIGS. 3 and 4, the preferred embodiment is illustrated. An adjacent groove 35 is provided to aid in resistance to extrusion of seals 24 and 26. A similar groove 37 is provided for external seal or seals 28.

The foregoing disclosure and description of the invention are illustrative and explanatory thereof, and various changes in the size, shape and materials, as well as in the details of the illustrated construction, may be made without departing from the spirit of the invention.

I claim:

1. A seal assembly for sealing between at least a first and second members, comprising;
   at least one unitary nonmetallic insert supported against longitudinal movement by contact with at least one of said members;
   at least one flexible seal supported by said insert at least on one face thereof and sealingly extending beyond said face into contact with an opposing one of said members;
   said seal is bonded to said insert;
   said insert has an annular shape with an inner and outer face, said bonded seal is disposed in at least one of said faces;
   said seal is bonded to said insert in a manner that said insert supports said seal against extrusion;
   said bonding to said insert allowing said seal to resist washout from applied fluid forces during make-up;
   said insert secured to one of said members and is sufficiently soft so as to not damage a sealing surface on said opposing member if flexing of said insert occurs during make-up or disassembly of the first and second members.

2. The seal assembly of claim 1, wherein said first member comprises a top sub and said second member comprises a seal nipple, wherein:
   said insert secured to the top sub with at least one said seal therebetween;
   said insert further comprising at least one second seal in contact with the seal nipple.

3. A seal assembly for sealing between at least a first and second members, comprising;
   at least one unitary nonmetallic insert supported against longitudinal movement by contact with at least one of said members;
   at least one flexible seal supported by said insert at least on one face thereof and sealingly extending beyond said face into contact with an opposing one of said members;
   said first member comprises a top sub and said second member comprises a seal nipple
   said insert secured to said top sub with a first seal therebetween;
   said insert further comprising a second seal bonded to said insert and in contact with said seal nipple;
   a J-slot assembly to retain said insert to said top sub in a manner that allows said insert to support at least one of said seals against extrusion;
   said insert being softer than said seal nipple so that deflection of said insert into contact with said seal nipple will not mar said seal nipple and prevent sealing contact with said seal nipple.

4. A method of sealing between two members, comprising the steps of:
   providing a unitary nonmetallic insert supported against longitudinal movement by at least one of the assembled members;
   bonding at least one flexible seal to said insert, said seal extending beyond a face on said insert, for sealing with an opposed one of said members;
   providing a bonded seal on an inside and outside face of said insert for sealing against both said members;
   selecting an insert material that is sufficiently soft so as not to damage a sealing surface on either of said members;
   supporting at least one of said seals with said insert in a manner so as to protect against seal extrusion.

5. The method of claim 4, further comprising the steps of:
   inserting said insert between a top sub and a seal nipple in an on/off connector;
   retaining said insert to said top sub in a manner that allows said insert to support at least one of said seals against extrusion.

* * * * *